(12) United States Patent
Wagener et al.

(10) Patent No.: US 8,693,818 B2
(45) Date of Patent: Apr. 8, 2014

(54) OPTICAL PROCESSING DEVICE

(75) Inventors: Jefferson Wagener, Morristown, NJ (US); Susumu Nakaya, Sakura (JP); Takaaki Ishikawa, Sakura (JP)

(73) Assignees: Nistica, Inc., Bridgewater, NJ (US); Fujikura Ltd., Tokyo (JP)

( * ) Notice: Subject to any disclaimer, the term of this patent is extended or adjusted under 35 U.S.C. 154(b) by 0 days.

(21) Appl. No.: 13/234,089

(22) Filed: Sep. 15, 2011

(65) Prior Publication Data
US 2013/0070337 A1 Mar. 21, 2013

(51) Int. Cl.
*G02B 6/26* (2006.01)
*G02B 15/00* (2006.01)

(52) U.S. Cl.
CPC .............. G02B 6/266 (2013.01); G02B 6/264 (2013.01); *G02B 6/26* (2013.01); *G02B 15/00* (2013.01)
USPC .............................. 385/16; 385/24; 359/676

(58) Field of Classification Search
USPC ............... 359/558–576, 615, 230–236, 432, 359/676–690, 641
See application file for complete search history.

(56) References Cited

U.S. PATENT DOCUMENTS

| | | | | |
|---|---|---|---|---|
| 6,842,549 | B2 * | 1/2005 | So | 385/15 |
| 7,072,539 | B2 * | 7/2006 | Wu et al. | 385/18 |
| 2004/0047632 | A1 * | 3/2004 | Powell | 398/83 |
| 2005/0146783 | A1 * | 7/2005 | Dair et al. | 359/362 |
| 2005/0213877 | A1 | 9/2005 | Wu et al. | |
| 2008/0130103 | A1 * | 6/2008 | Hara et al. | 359/369 |
| 2009/0027749 | A1 * | 1/2009 | Wagener et al. | 359/223 |
| 2009/0028501 | A1 | 1/2009 | Wagener | |

FOREIGN PATENT DOCUMENTS

EP  2999309  3/2011

* cited by examiner

*Primary Examiner* — Thong Nguyen
(74) *Attorney, Agent, or Firm* — Stuart H. Mayer; Mayer & Williams PC

(57) ABSTRACT

Provided is an optical processing device including: a beam emission portion which comprises a plurality of optical fibers; a plurality of collimating lenses to which a beam emitted from the optical fibers are incident; a dispersion element which disperses the beam emitted from one optical fiber among the plurality of optical fibers; and an optical path conversion optical system which converts an optical path of the beam passing through the dispersion element and allows the beam to be incident to another optical fiber among the plurality of optical fibers, wherein the plurality of collimating lenses is installed in series in the optical path direction of the beam emitted from the optical fiber, and wherein a distance between at least two collimating lenses are adjustable in the optical path direction.

8 Claims, 8 Drawing Sheets

OPTICAL PROCESSING DEVICE

TECHNICAL FIELD

The present invention relates to, for example, a wavelength-selective optical processing device.

BACKGROUND ART

Conventionally, an optical processing device has been used which includes a dispersion element (for example, a grating) dispersing a beam signal from an input path and an optical path conversion optical system allowing each of the dispersed beams to be incident to any of a plurality of output paths.

As such an optical path conversion optical system, a DMD (Digital Micromirror Device) is known that includes a plurality of micromirror elements, each of which is individually actuatable (for example, refer to Patent Document 1). The DMD may selectively switch an optical path of a reflected beam to any one of multiple output paths in a manner such that the directions of the mirror elements are adjusted to control the reflection direction of the beam.

SUMMARY OF THE INVENTION

However, according to the conventional optical processing device, the coupling loss may increase since the position of the returned beam from the optical path conversion optical system is deviated from the output path. In the optical path conversion optical system, the position of a component such as a mirror may not be adjusted due to the restriction of the structure thereof. For this reason, it is difficult to correct the deviation of the position of the returned beam.

The present invention is made in view of such circumstances, and an object thereof is to provide an optical processing device capable of suppressing the deviation of the position of the returned beam.

An optical processing device according to the present invention includes: a beam emission portion which comprises a plurality of optical fibers; a plurality of collimating lenses to which a beam emitted from the optical fibers are incident; a dispersion element which disperses the beam emitted from one optical fiber among the plurality of optical fibers; and an optical path conversion optical system which converts an optical path of the beam passing through the dispersion element and allows the beam to be incident to another optical fiber among the plurality of optical fibers, wherein the plurality of collimating lenses is installed in series in the optical path direction of the beam emitted from the optical fiber, and wherein a distance between at least two collimating lenses are adjustable in the optical path direction.

The optical path conversion optical system may include a mirror element which reflects the beam at a first reflection point and an intermediate mirror which reflects the beam reflected from the mirror element at an intermediate reflection point, the mirror element reflects the beam reflected from the intermediate mirror at a second reflection point.

The optical path conversion optical system may allow the beams dispersed by the dispersion element to be incident to any one of the other optical fibers in accordance with the wavelength of the beam.

Advantageous Effect of the Invention

According to the present invention, since the distance between the collimating lenses can be adjusted, the position of the optical path of the returned beam may be adjusted. Accordingly, even when the position of the mirror of the optical path conversion optical system is misaligned, the coupling loss of the optical fiber as the output path can be suppressed, and hence the output characteristic can be improved.

EMBODIMENTS FOR CARRYING OUT THE INVENTION

Hereinafter, an optical processing device according to an embodiment of the present invention will be described with reference to the drawings.

Figure 1:
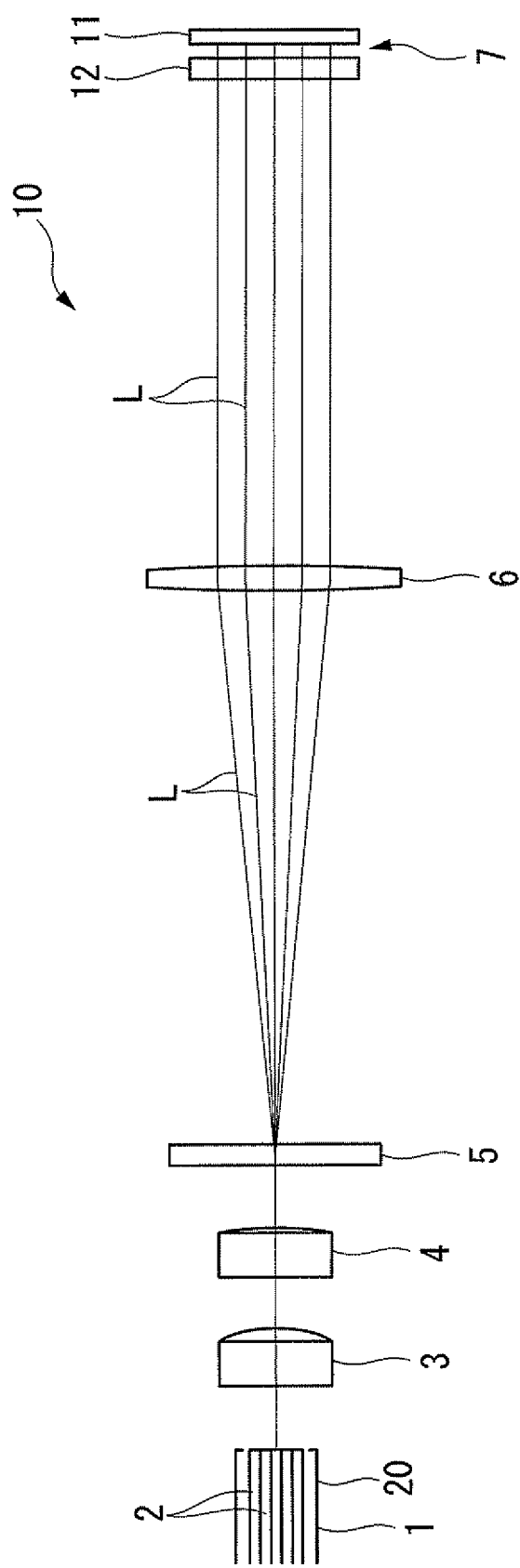
FIG. 1 is a schematic diagram illustrating an optical processing device according to an embodiment of the invention.
Figure 2:
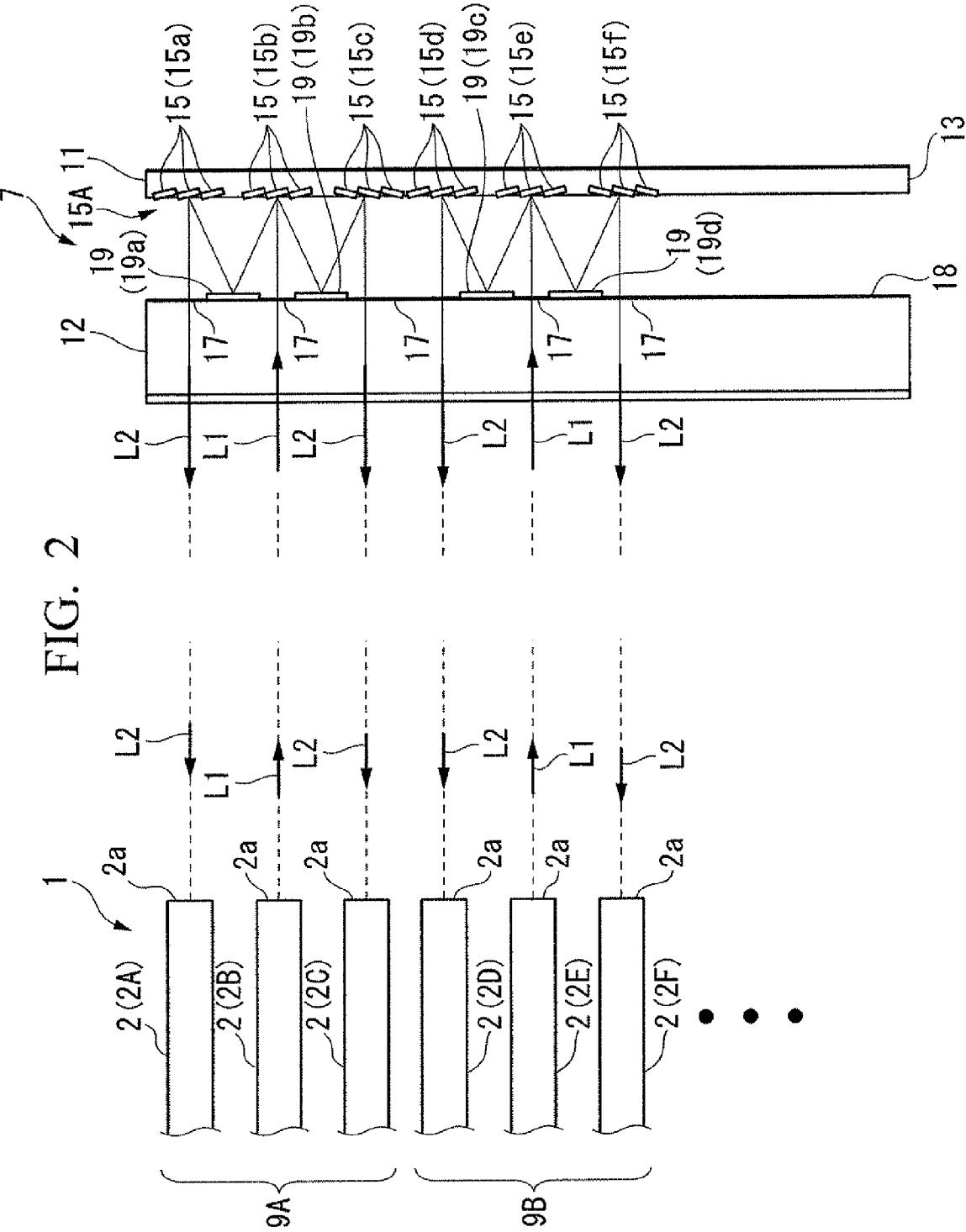
FIG. 2 is a schematic diagram illustrating a front end portion of an optical fiber and an optical path conversion optical system of the optical processing device of FIG. 1.
Figure 3:
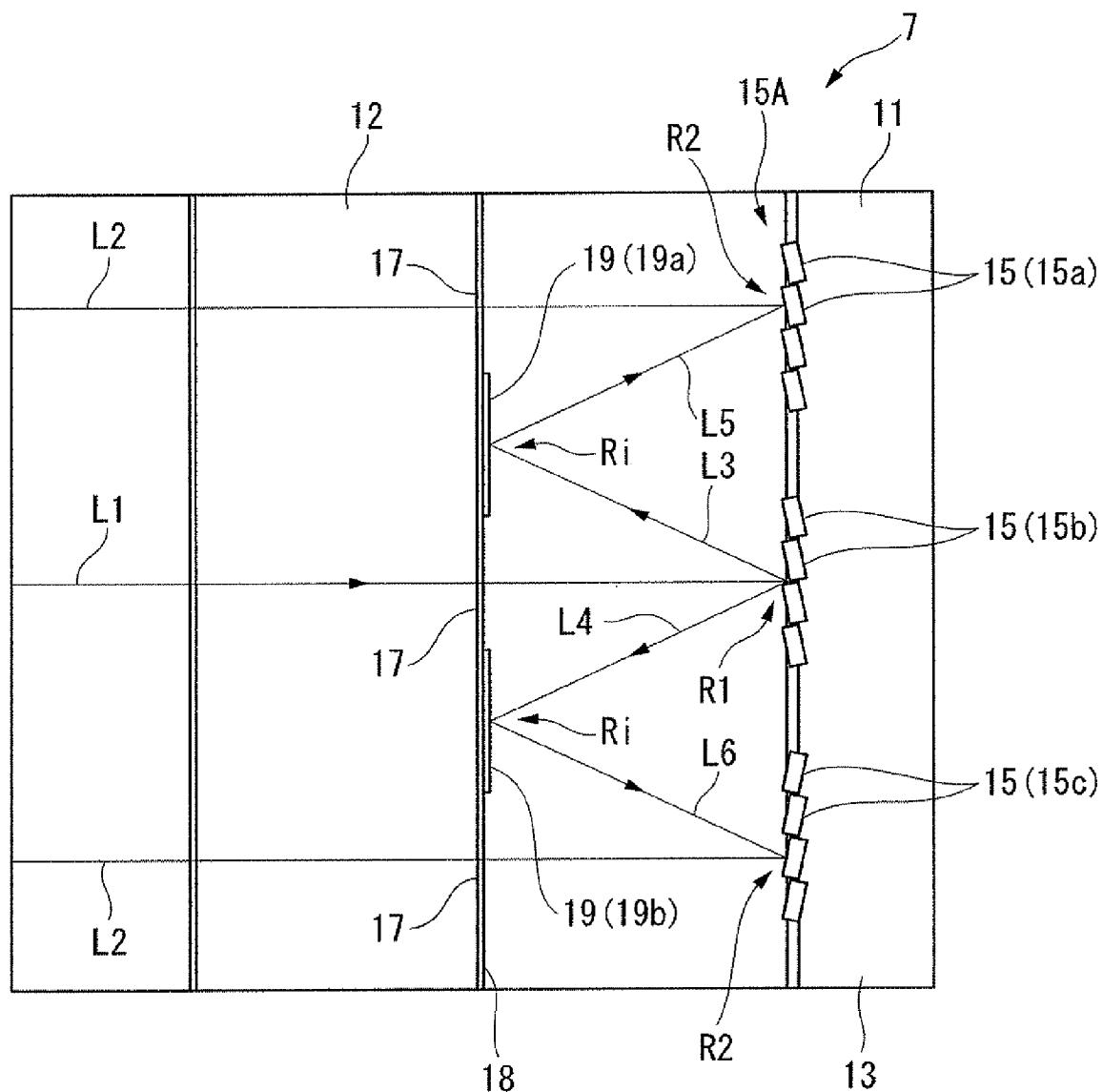
FIG. 3 is a schematic diagram illustrating the optical path conversion optical system of the optical processing device of FIG. 1.

FIG. 1 is a schematic diagram illustrating an optical processing device 10 according to an embodiment of the present invention. FIG. 2 is a schematic diagram illustrating a front end portion of an optical fiber 2 and an optical path conversion optical system 7 of the optical processing device 10. FIG. 3 is a schematic diagram illustrating the optical path conversion optical system 7.

As shown in FIG. 1, the optical processing device 10 includes: a beam emission portion 1 which includes a plurality of optical fibers 2; lens 3 and 4 (collimating lenses); a grating 5 (dispersion element) which disperses a beam passing through the lenses 3 and 4; a lens 6 (scan lens) (condenser lens) which focuses a beam passing through the grating 5; and the optical path conversion optical system 7 which converts an optical path of the beam passing through the lens 6.

As shown in FIGS. 1 and 2, the beam emission portion 1 includes a plurality of optical fibers 2 that propagate a beam input to and output from an external device and a holding portion 20 which holds the fibers arranged in a line in the width direction. As the beam emission portion 1, for example, a beam emission portion having an optical fiber array may be used.

As shown in FIG. 2, the optical fiber 2 (2A to 2F) may include a plurality of optical fiber groups 9A and 9B.

The optical fiber groups 9 include a plurality of optical fibers 2 that is capable of being optically coupled with each other. In the example shown in the drawing, the optical fibers 2A to 2C constitute a first optical fiber group 9A, and the optical fibers 2D to 2F constitute a second optical fiber group 9B. In the example shown in the drawing, each of the optical fiber groups 9 includes three optical fibers 2, but the present invention is not limited thereto. For example, the optical fiber group may include two or more optical fibers 2.

In the optical fiber group 9A, the optical path of a beam L1 emitted from the optical fiber 2B (input path) may be converted by the optical path conversion optical system 7, so that the beam may be incident as a returned beam L2 to the optical fibers 2A and 2C (output paths). In the optical fiber group 9B, the optical path of a beam L1 emitted from the optical fiber 2E (input path) may be converted by the optical path conversion optical system 7, so that the beam may be incident as a returned beam L2 to the optical fibers 2D and 2F (output paths).

It is desirable that the front end surface 2a of the optical fiber 2 as the input path and the front end surface 2a of the optical fiber 2 as the output path be located at the same position in the optical path direction. In the example shown in the drawing, the front end surfaces 2a of all optical fibers 2 (2A to 2F) are located at the same position in the optical path direction.

As shown in FIG. 1, lenses 3 and 4 collimate an emitted beam L1, and the first lens 3 is located at the returning direction side of the second lens 4 (the left side in FIG. 1). The first lens 3 (the first collimating lens) may be set to have a higher magnification than that of the second lens 4 (the second collimating lens). A curvature radius of a lens surface of the first lens 3 may be smaller than that of the second lens 4.

The first lens 3 and the second lens 4 are installed in series in the optical path direction (the left/right direction in FIG. 1) of the emitted beam L1, and one or both of them is movable in the optical path direction, so that a distance B between the lenses 3 and 4 can be adjusted.

The grating 5 may disperse the beam L (beam L1) emitted from the optical fiber 2 into multiple beams having different wavelengths. There is wavelength dependency in the beam emission direction of the grating 5, and it is desirable that the grating 5 sets different beam incident positions for each wavelength with respect to the optical path conversion optical system 7.

The lens 6 (scan lens) focuses the emitted beam L1 passing through the grating 5, and may form a focus inside the optical path conversion optical system 7.

The lens 6 (scan lens) collimates multiple beams having different wavelengths.

As shown in FIGS. 2 and 3, the optical path conversion optical system 7 converts the optical path of the beam L1 emitted from one optical fiber 2 of the plurality of optical fibers 2, so that the beam is incident as the returned beam L2 (beam L) to the other optical fiber 2.

The optical path conversion optical system 7 includes a body portion 11 and an intermediate reflection portion 12 which is installed at the returning direction side of the body portion 11 (the left side in FIGS. 2 and 3) with a gap with respect to the body portion 11.

The body portion 11 includes a support portion 13 and a plurality of mirror elements 15 (15a, 15b, 15c, ...) which are installed at the surface on the returning direction side of the support portion 13. The mirror elements 15 may be disposed in parallel in an area along the surface on the returning direction side of the support portion 13, thereby forming a mirror element assembly 15A.

The inclination of each of the mirror elements 15 is adjustable, and when the reflection direction of the beam is controlled by adjusting the inclination, the optical path of the reflected beam can be set.

As the body portion 11, a DMD (Digital Micromirror Device) having a plurality of micromirror elements, each of which is individually actuatable, may be used.

The intermediate reflection portion 12 includes a frame 18 which has a plurality of window portions 17 allowing beams to pass therethrough and a plurality of intermediate mirrors 19 (19a to 19d) installed in the frame 18.

The intermediate mirrors 19 are installed at the surface on the emission direction (the right side in FIGS. 2 and 3) of the frame 18 so that the beam reflected from the mirror elements 15 is reflected toward another mirror element 15. The intermediate mirrors 19 are installed with an interval in the vertical direction in FIGS. 2 and 3. In the example shown in the drawing, each window portion 17 is formed between the intermediate mirrors 19 which are adjacent to each other in the vertical direction.

The optical path conversion optical system 7 converts the optical paths of the beams dispersed by the grating 5 into different optical paths in accordance with the mirror elements 15, so that the returned beam L2 can be incident to any one of the optical fibers 2.

For example, the returned beam L2 may be incident to the different optical fiber 2 in accordance with each wavelength. For this reason, the optical path conversion optical system 7 may function as a switch optical system. In this case, the optical processing device 10 functions as a wavelength-selective switch.

Since the optical path conversion optical system 7 may control the direction of the beam so as not to incident to the optical fiber 2, the optical path conversion optical system may select whether the beam of each wavelength is individually incident to one of the other optical fibers 2 or is not incident to any of the other optical fibers 2.

For this reason, the optical path conversion optical system 7 may also function as a block optical system. In this case, the optical processing device 10 functions as a wavelength blocker.

The optical path conversion optical system 7 may convert the optical path so that the beam is incident to the optical fiber 2 by attenuating the beam of each wavelength with a predetermined attenuation rate. For example, a beam of a predetermined wavelength may be incident to the optical fiber 2 while attenuating the beam by adjusting the reflection amount using the mirror elements 15.

For this reason, the optical path conversion optical system 7 may also function as a filter optical system. In this case, the optical processing device 10 functions as a wavelength filter.

As shown in FIGS. 1 and 2, the beam propagated inside the optical fiber 2 and the beam L1 emitted from the optical fiber 2 may be a wavelength multiplexed light containing multiple signal beams having different wavelengths.

The beam L1 emitted from the front end surface 2a of the optical fiber 2 is collimated by the lenses 3 and 4 (collimating lenses), and then is dispersed into multiple beams having different wavelengths by the grating 5.

The dispersed emitted beams L1 travels toward the optical path conversion optical system 7 while being focused by the lens 6 (scan lens).

As shown in FIGS. 2 and 3, in the optical path conversion optical system 7, the emitted beam L1 passes through each window portion 17 of the intermediate reflection portion 12 and arrives at each mirror element 15, and the beam reflected from the mirror element 15 travels toward the intermediate mirror 19.

For example, as shown in FIG. 3, the beam L1 emitted from the optical fiber 2B is reflected by the mirror element 15b, and then the reflected beams L3 and L4 having different wavelengths may respectively travel toward the intermediate mirrors 19a and 19b. The point where the emitted beam L1 is initially reflected by the mirror element 15 is referred to as a first reflection point R1 (refer to FIG. 3). In the example, the first reflection point R1 is the mirror element 15b.

It is desirable that the focal position of the emitted beam L1 be a first reflection point R1 or a position close thereto.

The reflected beams L3 and L4 are respectively reflected by the intermediate mirrors 19a and 19b, the reflected beams L5 and L6 respectively travel toward the mirror elements 15a and 15c to be reflected by the mirror elements 15a and 15c, and then the reflected beam (returned beam L2) passes through the window portion 17 of the intermediate reflection portion 12 to travel toward the optical fibers 2A and 2C (output path) (refer to FIG. 2).

As shown in FIG. 3, the point where the beams L3 and L4 are reflected by the intermediate mirror 19 (19a and 19b) is referred to as an intermediate reflection point Ri.

The point where the beams L5 and L6 reflected from the intermediate mirror 19 are reflected by the mirror element 15 is referred to as a second reflection point R2. In the example, the second reflection point R2 is the mirror elements 15a and 15c.

As shown in FIGS. 1 and 2, a returned beam L2 is collimated by the lens 6, is focused by the lenses 3 and 4, and then is incident to a front end surface 2a of an optical fiber 2.

Figure 4:
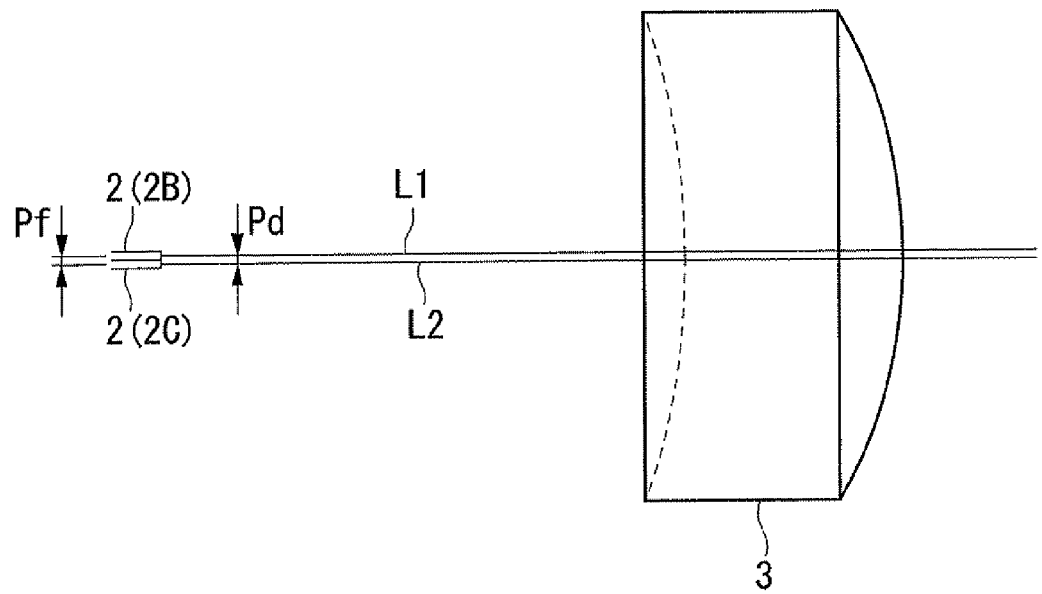
FIG. 4 is a schematic diagram illustrating the front end portion of the optical fiber and the lens of the optical processing device of FIG. 1.
Figure 5:
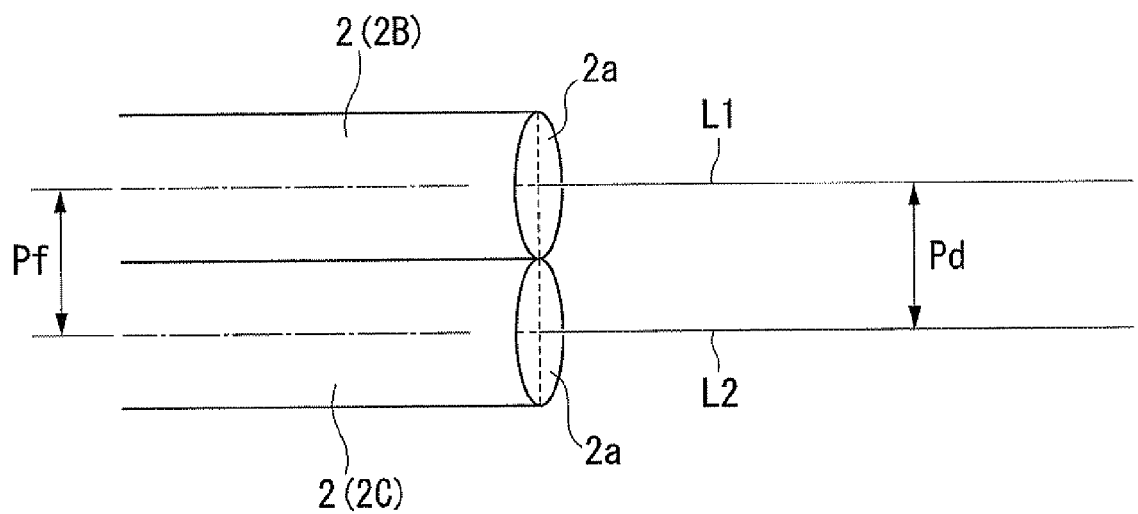
FIG. 5 is a schematic diagram illustrating the front end portion of the optical fiber of the optical processing device of FIG. 1.

As shown in FIGS. 4 and 5, the emitted beam L1 emitted from an optical fiber 2B (an input path) is incident as the returned beam L2 to an optical fiber 2C (an output path) adjacent to the optical fiber 2B.

The Pf in the figures indicates a pitch between the optical fiber 2B (the input path) and the optical path 2C (the output path). The Pd indicates a pitch (a distance between the optical fibers 2 in the width direction) between the emitted beam L1 and the returned beam L2.

Figure 6:
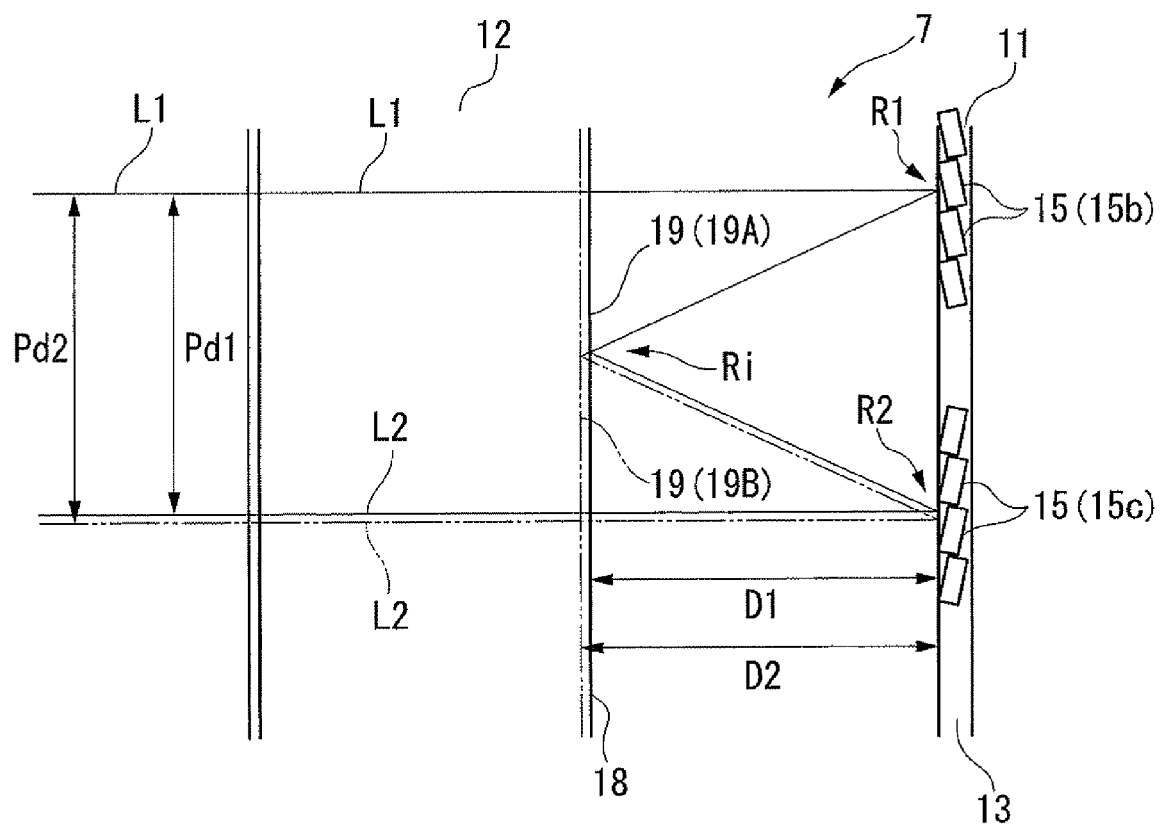
FIG. 6 is a schematic diagram illustrating the optical path conversion optical system of the optical processing device of FIG. 1.

As shown in FIG. 6, the pitch Pd between the emitted beam L1 and the returned beam L2 is dependent on a distance of an intermediate mirror 19 with respect to a mirror element 15.

For example, when the intermediate mirror 19 is located at the position (an intermediate mirror 19A) depicted by the solid line, if the distance thereof with respect to the mirror element 15 in the optical path direction (the left/right direction of FIG. 6) is D1, the pitch between the emitted beam L1 and the returned beam L2 becomes Pd1.

When the intermediate mirror 19 is located at the position (an intermediate mirror 19B) depicted by the chain double-dashed line, if the distance between the mirror element 15 and the intermediate mirror 19 is D2 larger than D1, the pitch between the emitted beam L1 and the returned beam L2 becomes Pd2 larger than Pd1 as depicted by the chain double-dashed line.

The reason why the pitch Pd varies in accordance with the position of the intermediate mirror 19 is because the positions of the intermediate reflection point Ri and the second reflection point R2 varies in accordance with the position of the intermediate mirror 19.

Figure 7:
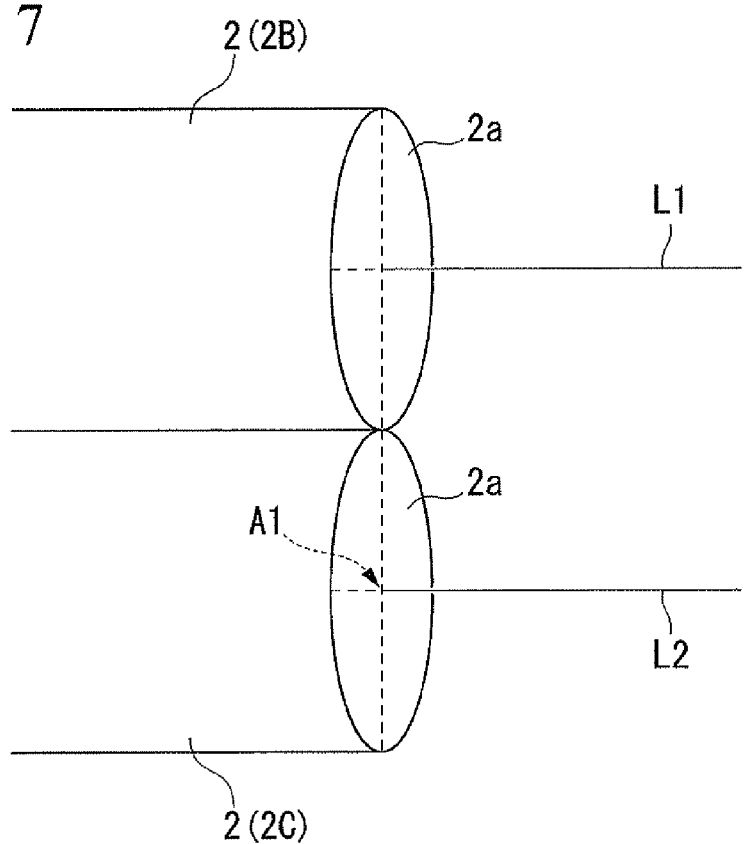
FIG. 7 is a schematic diagram illustrating a more detailed view of the front end portion of the optical fiber of the optical processing device of FIG. 1 where the pitch between the emitted beam and the returned beam is Pd1.
Figure 8:
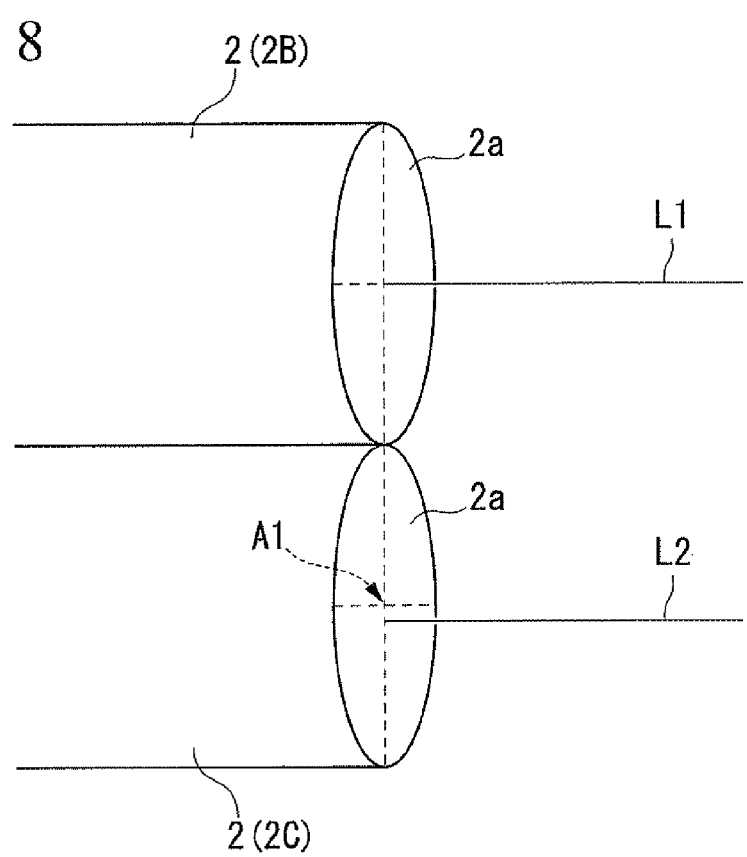
FIG. 8 is a schematic diagram illustrating the front end portion of the optical fiber of the optical processing device of FIG. 1 where the pitch between the emitted beam and the returned beam is Pd2.

As shown in FIG. 7, in cases where the pitch between the emitted beam L1 and the returned beam L2 is Pd1 and the returned beam L2 is incident to the axial position A1 of the optical fiber 2C, the incident position of the returned beam L2 is deviated from the axial position A1 of the optical fiber 2C when the pitch between the emitted beam L1 and the returned beam L2 is Pd2 as shown in FIG. 8.

That is, when an intermediate reflection portion 12 is installed at the returning direction side (the left side in FIG. 6) of the design position, the intermediate mirror 19 is located at the position of the returning direction side. Accordingly, the pitch Pd between the emitted beam L1 and the returned beam L2 becomes larger, and thus there is a concern that a positional deviation of the returned beam L2 occurs as shown in FIG. 8.

However, the positional adjustment of the intermediate reflection portion 12 with respect to a body portion 11 may be difficult due to the restriction of the structure of the optical path conversion optical system 7. In this case, it is not easy to correct the positional deviation of the returned beam L2 through the adjustment of the optical path conversion optical system 7.

Figure 9:
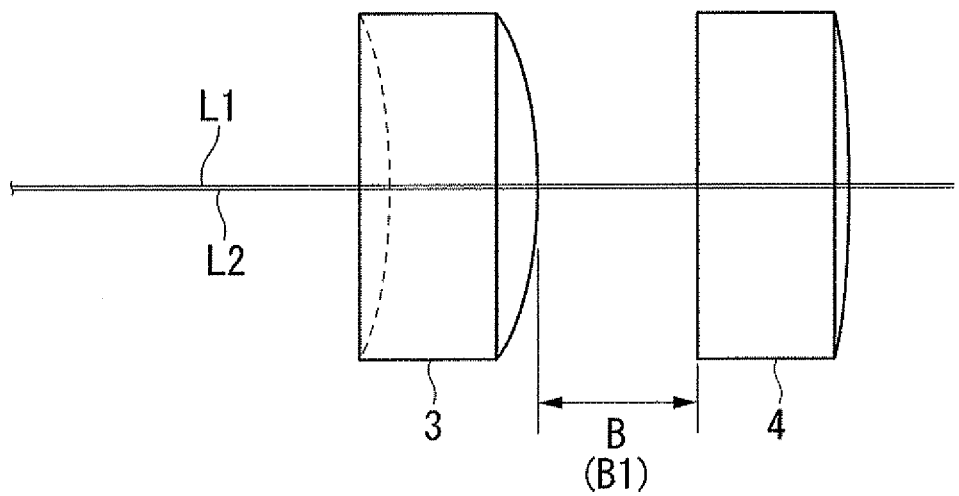
FIG. 9 is a schematic diagram illustrating the first lens and the second lens of the optical processing device of FIG. 1 with a distance B1 between the lenses.
Figure 10:
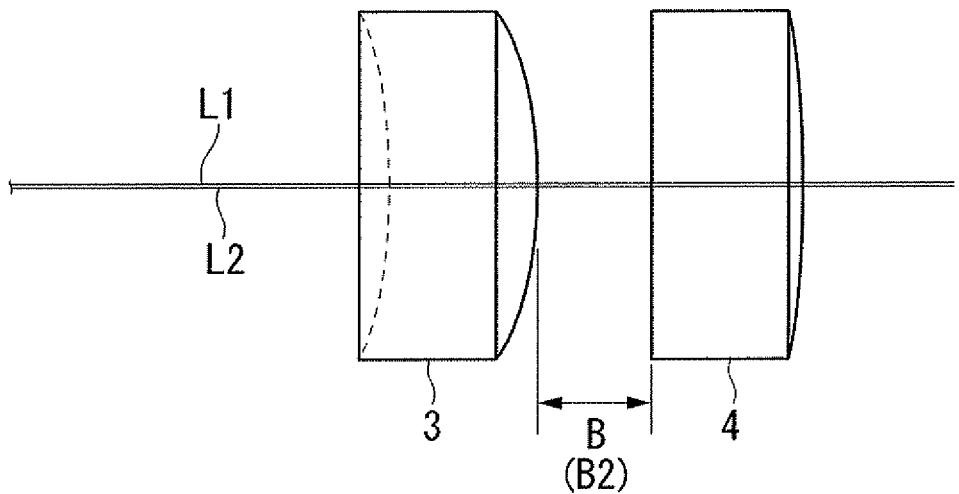
FIG. 10 is a schematic diagram illustrating the first lens and the second lens of the optical processing device of FIG. 1 with a distance B2 between the lenses.

As shown in FIGS. 9 and 10, in the optical processing device 10, since one or both of the lenses 3 and 4 (the collimating lenses) are movable in the optical axis direction (the left/right direction in FIGS. 9 and 10), the pitch Pd between the emitted beam L1 and the returned beam L2 can be adjusted through the positional adjustment of the lenses 3 and 4. The reason is as follows.

An optical imaging ratio is dependent on the distance B between the first and second lenses 3 and 4. That is, when the distance B (B1) between the lenses 3 and 4 is comparatively large as shown in FIG. 9, the optical imaging ratio becomes smaller. When the distance B (B2) between the lenses 3 and 4 becomes smaller as shown in FIG. 10, the optical imaging ratio becomes larger.

For this reason, when there is a positional deviation of the retuned beam L2 as shown in FIG. 8, the optical imaging ratio is changed by adjusting the distance B (B2) between the lenses 3 and 4 as shown in FIG. 10. Accordingly, the pitch Pd is changed by adjusting the position of the optical path of the retuned beam L2 as shown in FIG. 7, whereby the retuned beam L2 can be incident to the axial position A1 of the optical fiber 2C.

Accordingly, even when the position of the intermediate mirror 19 of the optical path conversion optical system 7 is misaligned, the output characteristic can be improved by suppressing the coupling loss.

In order to obtain the optimal optical imaging ratio without adversely affecting the collimation of the lenses 3 and 4, it is necessary to appropriately set the distance between the optical fiber 2 and the lenses 3 and 4. For this reason, if necessary, the positions of the lenses 3 and 4 may be adjusted to appropriately set the distance from the optical fiber 2.

In the example shown in the figures, two lenses (the lenses 3 and 4) are used as the collimating lenses, but the number of the collimating lenses may be three or more. In those cases, a distance between at least two of the lenses may be adjustable in the optical path direction.

In cases where only one spherical lens is used as the collimating lens, there is a concern that the coupling efficiency becomes low due to the influence of spherical aberration. In contrast, according to the present invention, since the multiple lenses are used as the collimating lenses, the spherical aberration may be reduced by appropriately setting the distance between the lenses.

Figure 11:
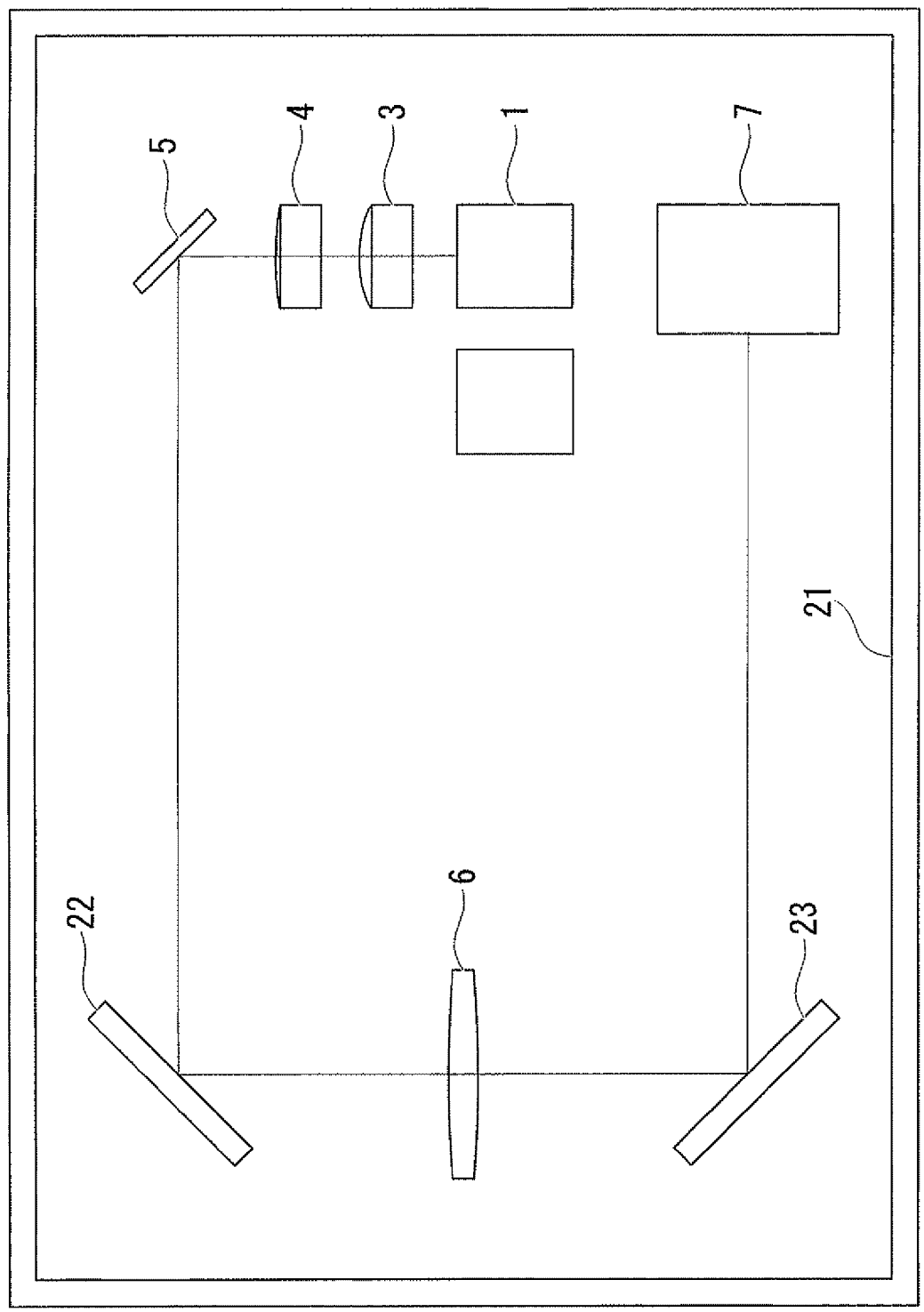
FIG. 11 is a configuration diagram illustrating an example of a specific configuration of the optical processing device of FIG. 1.

FIG. 11 illustrates an example of a specific configuration of the optical processing device 10. The optical processing device 10 shown in the drawing includes a case 21 that is provided with: the beam emission portion 1; the lens 3 and 4 (collimating lenses); the gratings 5 which disperse the beam from the lenses 3 and 4; the lens 6 (scan lens); and the optical path conversion optical system 7. The symbols 22 and 23 denote the mirrors.

The number of the optical fibers of the beam emission portion 1 is not particularly limited, and may be arbitrarily, for example, three or more. Further, the number of the mirror elements of the optical path conversion optical system may be arbitrarily set to one or more. Furthermore, the number of times of reflecting the beam in the mirror element and the intermediate mirror is not limited to the above-described example.

DESCRIPTION OF SYMBOLS

1: BEAM EMISSION PORTION
2: OPTICAL FIBER
3: THE FIRST LENS (THE FIRST COLLIMATING LENS)
4: THE SECOND LENS (THE SECOND COLLIMATING LENS)
5: GRATING (DISPERSION ELEMENT)
6: LENS (CONDENSER LENS)
7: OPTICAL PATH LENGTH CONVERSION OPTICAL SYSTEM
15: MIRROR ELEMENT
19: INTERMEDIATE MIRROR
L1: EMITTED BEAM
L2: RETURNED BEAM
R1: FIRST REFLECTION POINT
R2: SECOND REFLECTION POINT
Ri: INTERMEDIATE REFLECTION POINT
B, B1, B2: DISTANCE BETWEEN THE FIRST LENS AND THE SECOND LENS

What is claimed is:

1. An optical processing device, comprising:
a plurality of optical ports;
at least two lenses having an adjustable magnification for receiving an optical beam received from any of the optical ports;
a dispersion element for spatially dispersing the optical beam received from at least two lenses into a plurality of wavelength components; and
an optical path conversion system for receiving the plurality of wavelength components and selectively directing at least one of the wavelength components to a prescribed one of the optical ports, said optical path conversion system including a digital micromirror device (DMD) from which at least one wavelength component is reflected at least twice before being directed to the prescribed optical port and a reflective element for receiving the reflected wavelength components from the DMD and directing them back onto the DMD, said magnification of the at least two lenses being adjustable to compensate for variations in spacing between the DMD and the reflecting element.

2. The optical processing device of claim 1 wherein said magnification is adjustable so that a pitch between an optical beam from one of the optical ports and the at least one wavelength component selectively directed to the prescribed optical port is adjustable.

3. The optical processing device of claim 2 wherein the at least lenses have a common optical axis and a distance between the at least two lenses along the common optical axis is user adjustable.

4. The optical processing device of claim 1 wherein said at least two lenses are positionally adjustable with respect to one another to adjust a magnification.

5. The optical processing device of claim 4 wherein at least one of the lenses includes a collimating lens.

6. The optical processing device of claim 4 wherein each of the lenses is a collimating lens.

7. The optical processing device of claim 1 wherein the reflective element includes a plurality of planar mirrors having reflective surfaces that face reflective surfaces of mirror elements of the DMD.

8. The optical processing device of claim 1 wherein the optical path conversion system is configured to selectively direct each of the wavelength components to a different one of the optical ports.

* * * * *